United States Patent [19]
Rice

[11] 4,070,104
[45] Jan. 24, 1978

[54] NOSE PAD FOR EYEGLASSES

[76] Inventor: Woodrow R. Rice, 2219 Mohawk Lane, Wichita, Kans. 67203

[21] Appl. No.: 748,049

[22] Filed: Dec. 6, 1976

[51] Int. Cl.² ............................................. G02C 5/12
[52] U.S. Cl. ................................... 351/138; 351/132; 351/136; 351/139
[58] Field of Search ................ 351/136, 138, 139, 132

[56] References Cited
U.S. PATENT DOCUMENTS
3,186,001  5/1965  Roeder .................................. 351/138

*Primary Examiner*—Paul A. Sacher
*Attorney, Agent, or Firm*—Edwin H. Crabtree; John H. Widdowson

[57] ABSTRACT

A nose pad for a nose piece on a pair of eyeglasses. The nose pad provides a soft air cushion to relieve pressure against the nose when the eyeglasses are worn.

8 Claims, 7 Drawing Figures

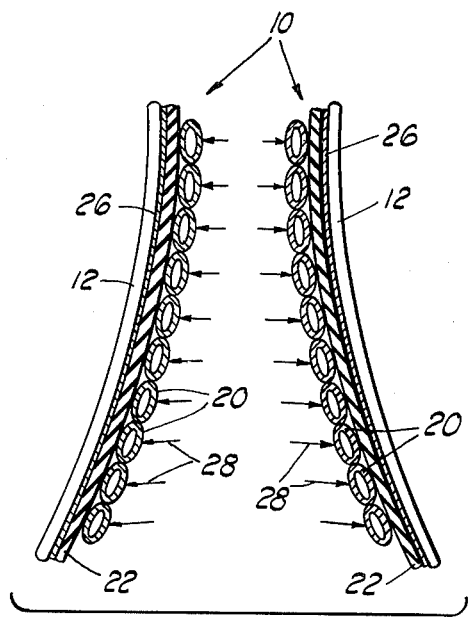
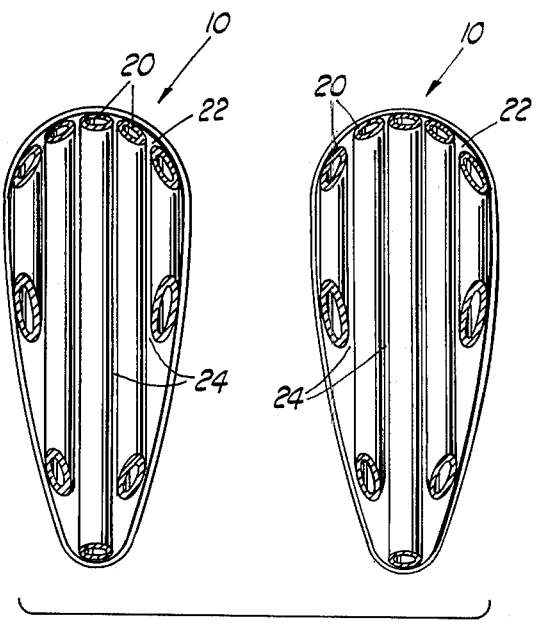
Fig. 4　　　　　Fig. 5
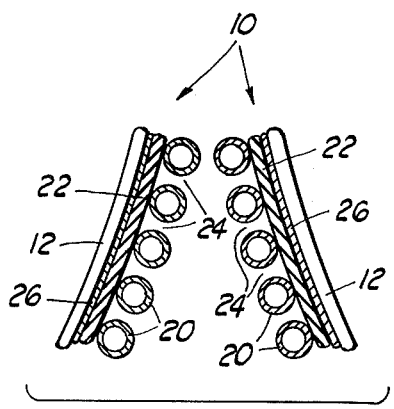
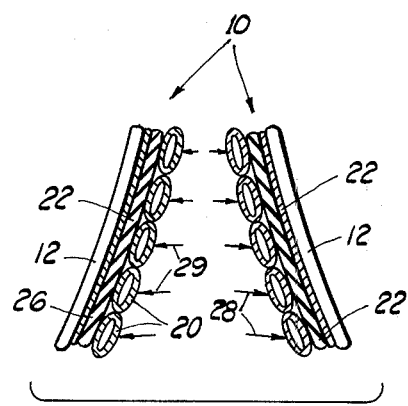
Fig. 6　　　　　Fig. 7

NOSE PAD FOR EYEGLASSES

BACKGROUND OF THE INVENTION

This invention relates generally to eyeglasses and more particularly, but not by way of limitation to a nose pad on a nose piece of the eyeglasses.

Heretofore, there have been different types of eyeglass frames, pads for the nose piece on the eyeglasses, and various eyeglass attachments for mounting on the nose piece. These nose piece devices have included foam rubber pads, threaded beads, shark skin, and blades with teeth therein. While these devices prevent slippage of the eyeglass on the nose of the eyeglass user, none of the devices herein have had as a primary objective means for relieving pressure against the nose placed thereon by the nose piece of the eyeglasses.

SUMMARY OF THE INVENTION

The subject nose pad for a nose piece on a pair of eyeglasses provides a plurality of soft plastic parallel tubes which provide a soft air cushion for reducing pressure against the side of the nose.

The nose pad is lightweight and is easily applied to various types of nose pieces wherein a pressure sensitive adhesive coating quickly allows a padded base of the nose pad to be attached to the eyeglasses. The nose pad prevents the nose piece from slipping on the nose and provides a compressive force against the nose to securely hold the nose piece against the sides of the nose.

The nose pad includes a padded base with one side of the base having a pressure sensitive adhesive coating. The coating is applied against the side of the nose piece for attaching the pad thereto. On the opposite side of the padded base, is a plurality of spaced parallel tubing. The tubing is compressed against the side of the nose for providing a soft air cushion against the sides of the nose when the eyeglasses are in use.

The advantages and objects of the invention will become evident from the following detailed description when read in conjunction with the accompanying drawings which illustrate the preferred embodiments of the invention.

BRIEF DESCRIPTION OF THE DRAWINGS

FIG. 4 is a side view of the nose pad illustrating the tubing compresses while in use on the nose of the eyeglass user.

FIG. 5 is a front view of an alternate embodiment of the nose pad.

FIG. 6 is a top view of the alternate embodiment.

FIG. 7 is a top view of the alternate embodiment with the tubing compressed.

DETAILED DESCRIPTION OF THE DRAWINGS

Figure 1:
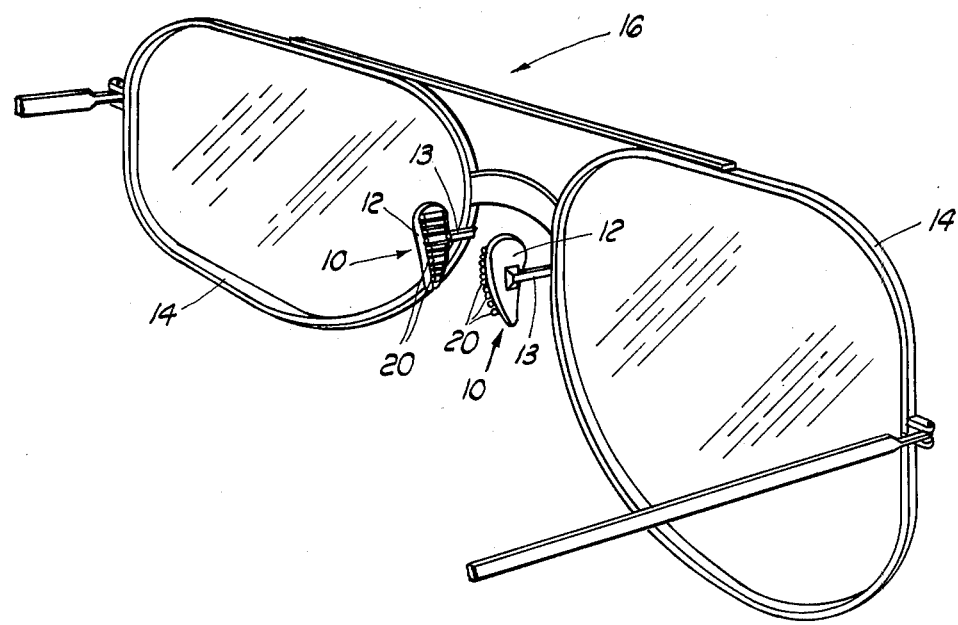
FIG. 1 illustrates a perspective view of a pair of eyeglasses with the nose pad attached to the nose piece of the eyeglass.

In FIG. 1, the nose pad is designated by general reference numeral 10. The nose pad 10 is attached to a pair of nose pieces 12 which in turn are attached to nose piece arms 13. The nose piece arms 13 are mounted on a frame 14 of a pair of eyeglasses 16. The nose pad in this view can be seen with a plurality of parallel hollow tubes 20.

Figures 2, 3:
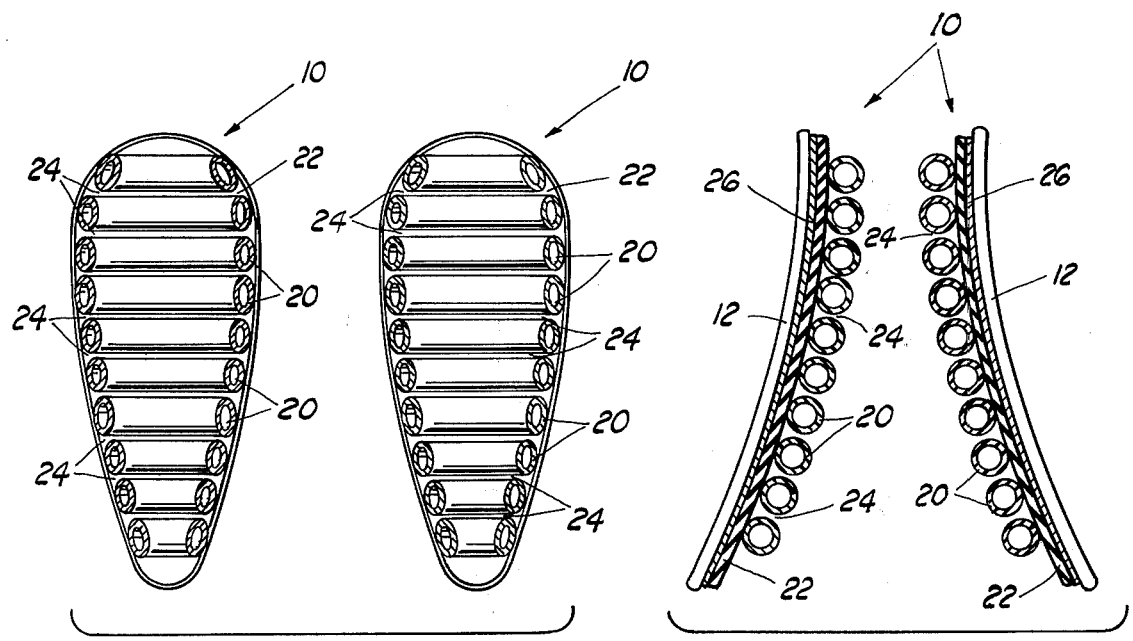
FIG. 2 is a front view of the nose pad.
FIG. 3 is a side view of the nose pad.

In FIG. 2, a front view of the nose pad 10 is illustrated. In this view, the tubing 20 can be seen mounted laterally on a padded base 22. The padded base 22 may be made of foam rubber, foam plastic, or the like, The tubing 20 are mounted parallel to each other and in a spaced relationship wherein a space 24 is provided between each of the individual tubes 20. The space 24 is substantially smaller than the radius of the tubes 20. The tubing 20 may be constructed of soft hollow silicon plastic resin or any other soft resilient tubing material.

In FIG. 3, a side view of the nose pad 10 can be seen illustrating a cross section of the padded base 22 and tubes 20. On the opposite side of the base 22 is a coating 26 of pressure sensitive adhesive which is used for attaching the nose pad 10 to the sides of the nose piece 12.

In FIG. 4, a side view of the nose pad 10 is illustrated wherein the tubes 20 are compressed by a force indicated by arrows 28. The force would be typical of when the nose piece 12 is mounted on the nose and compression is applied against the soft tubes 20. It should be noted that when the tubes 20 are compressed, the sides of the tubes 20 expand outwardly contacting the sides of the adjacent tube. The spaced relationship of the tubes 20 where the sides contact each other, prevent the tubes 20 from flattening against the base 22 and allow the hollow portion of the tubes 20 to remain open allowing the air cushion effect of the pad 10 against the nose. By providing an air cushion through the use of the soft hollow tubes 20, the sides of the nose do not contact the normal hard plastic surface of the nose piece 12, thereby greatly reducing uncomfortable pressure on the nose caused by the eyeglasses 16.

In FIG. 5, an alternate embodiment of the nose pad is illustrated, wherein the tubes 20 are positioned parallel to each other and mounted longitudinally along the length of the base 22. Note again the space 24 provided between the tubes 20 is substantially less than the radius of the tubes 20.

In FIG. 6, a top cross sectional view of the nose pad 10 is illustrated. In this view, the spaces 24 can be seen between each of the tubes 20.

In FIG. 7, again the nose pad 10 is illustrated wherein a force indicated by arrows 28 is applied against the sides of the individual tubes 20 and the sides of the tubes 20 extend outwardly contacting the sides of the adjacent tubes 20 thereby providing an air cushion support against the sides of the nose.

Changes may be made in the construction and arrangement of the parts or elements of the embodiment as disclosed herein without departing from the spirit or scope of the invention as defined in the following claims.

I claim:

1. A nose pad for a nose piece on a pair of eyeglasses, the nose pad comprising:
   a padded base with one side of said base having a pressure sensitive adhesive coating thereon for securing said base to the nose piece; and
   a plurality of spaced parallel tubing mounted on the opposite side of said base, said tubing being compressed against the sides of the nose for providing an air cushion when the eyeglasses are in use.

2. The nose pad as described in claim 1, wherein said parallel tubing is mounted on said base in a spaced relationship so that when said tubing is compressed, the sides of each of said tubes contact the sides of the adjacent tube to prevent said tubes from flattening against said base.

3. The nose pad as described in claim 2, wherein said tubing is mounted laterally along the width of said base.

4. The nose pad as described in claim 2, wherein said tubing is mounted longitudinally along the length of said base.

5. A nose pad for a nose piece on a pair of eyeglasses, the nose pad comprising:
- a padded base with one side of said base having a pressure sensitive adhesive coating thereon for securing the base to the nose piece; and
- a plurality of equally spaced parallel tubing mounted on the opposite side of said base, said tubing being compressed against the sides of the nose and holding the eyeglasses thereon when the eyeglasses are in use, said tubing mounted in a spaced relationship so that the sides of each of said tubes when compressed contact the sides of the adjacent tube to prevent said tubes from flattening against said base.

6. The nose pad as described in claim 5, wherein said padded base is made of foam rubber.

7. The nose pad as described in claim 5, wherein said tubing is made of a soft silicon plastic resin.

8. The nose pad as described in claim 5, wherein said padded base is made of foam plastic.

* * * * *